(12) United States Patent
Schnell et al.

(10) Patent No.: US 9,267,272 B2
(45) Date of Patent: Feb. 23, 2016

(54) SANITARY INSERTION UNIT AND SHOWER FITTING HAVING A SANITARY INSERTION UNIT

(75) Inventors: Thomas Schnell, Muttenz (CH); Alexander Stein, Ihringen (DE)

(73) Assignee: NEOPERL GMBH, Mullheim (DE)

( * ) Notice: Subject to any disclaimer, the term of this patent is extended or adjusted under 35 U.S.C. 154(b) by 530 days.

(21) Appl. No.: 13/703,426

(22) PCT Filed: Mar. 11, 2011

(86) PCT No.: PCT/EP2011/001212
§ 371 (c)(1),
(2), (4) Date: Dec. 11, 2012

(87) PCT Pub. No.: WO2011/157309
PCT Pub. Date: Dec. 22, 2011

(65) Prior Publication Data
US 2013/0087637 A1    Apr. 11, 2013

(30) Foreign Application Priority Data
Jun. 16, 2010   (DE) .................... 20 2010 009 135 U

(51) Int. Cl.
*G05D 7/01* (2006.01)
*E03C 1/08* (2006.01)
(Continued)

(52) U.S. Cl.
CPC .............. *E03C 1/08* (2013.01); *E03C 1/0409* (2013.01); *E03C 1/104* (2013.01); *F16L 55/027* (2013.01); *E03C 2001/026* (2013.01)

(58) Field of Classification Search
CPC ....... F16L 55/027; B05B 1/3006; B05B 1/18; E03C 1/0404; E03C 1/08
USPC ............ 138/45, 46, 43; 239/590, 590.5, 570, 239/571, 575, 525, 530
See application file for complete search history.

(56) References Cited

U.S. PATENT DOCUMENTS 2,343,774 A    3/1944  Klein
3,847,178 A *  11/1974 Keppel ...................... 137/515.7
(Continued)

FOREIGN PATENT DOCUMENTS

DE    202008017031 U1   5/2010
GB        213183 A      3/1924
(Continued)

*Primary Examiner* — Patrick F Brinson
(74) *Attorney, Agent, or Firm* — Volpe and Koenig, P.C.

(57) ABSTRACT

A sanitary insertion unit which has a sealing ring (1) with a sleeve-shaped extension (2), the free end region of which extension (2) has a head (3) which protrudes circumferentially and, when the extension (2) is inserted into an associated line section, can be deformed at least in regions in such a manner that the head (3) of the extension (2) is placed onto the inner circumferential wall of the line section (5). The invention also relates to a sanitary insertion unit which has a flow regulator or is designed as a flow regulator, the outer circumference of the housing of which flow regulator bears a clamping edge region for, in particular, sealing and clamping the flow regulator between two interconnected line sections, wherein the flow regulator bears a sleeve-shaped extension, the circumferentially protruding head of which, produced from elastic material, can be deformed, when the extension is inserted into a line section, in such a manner that the head is placed onto the inner circumferential wall of the line section. Finally, the present invention is also concerned with a shower fitting having a line section which is configured in the form of a shower connection and in the line interior of which one of the above-described insertion units can be inserted.

12 Claims, 8 Drawing Sheets

(51) Int. Cl.
*E03C 1/04* (2006.01)
*E03C 1/10* (2006.01)
*F16L 55/027* (2006.01)
*E03C 1/02* (2006.01)

(56) References Cited

U.S. PATENT DOCUMENTS 5,634,491 A * 6/1997 Benedict .................. 137/504
6,571,831 B1 * 6/2003 Hart ........................ 138/46
6,705,549 B2 * 3/2004 Nakamura ................ 239/533.1
D506,811 S * 6/2005 Nakamura et al. ........ D23/259
7,543,763 B1 * 6/2009 Wu .......................... 239/590.5

FOREIGN PATENT DOCUMENTS

JP   11-193559 A      7/1999
WO   2006/126781 A1   11/2006

* cited by examiner

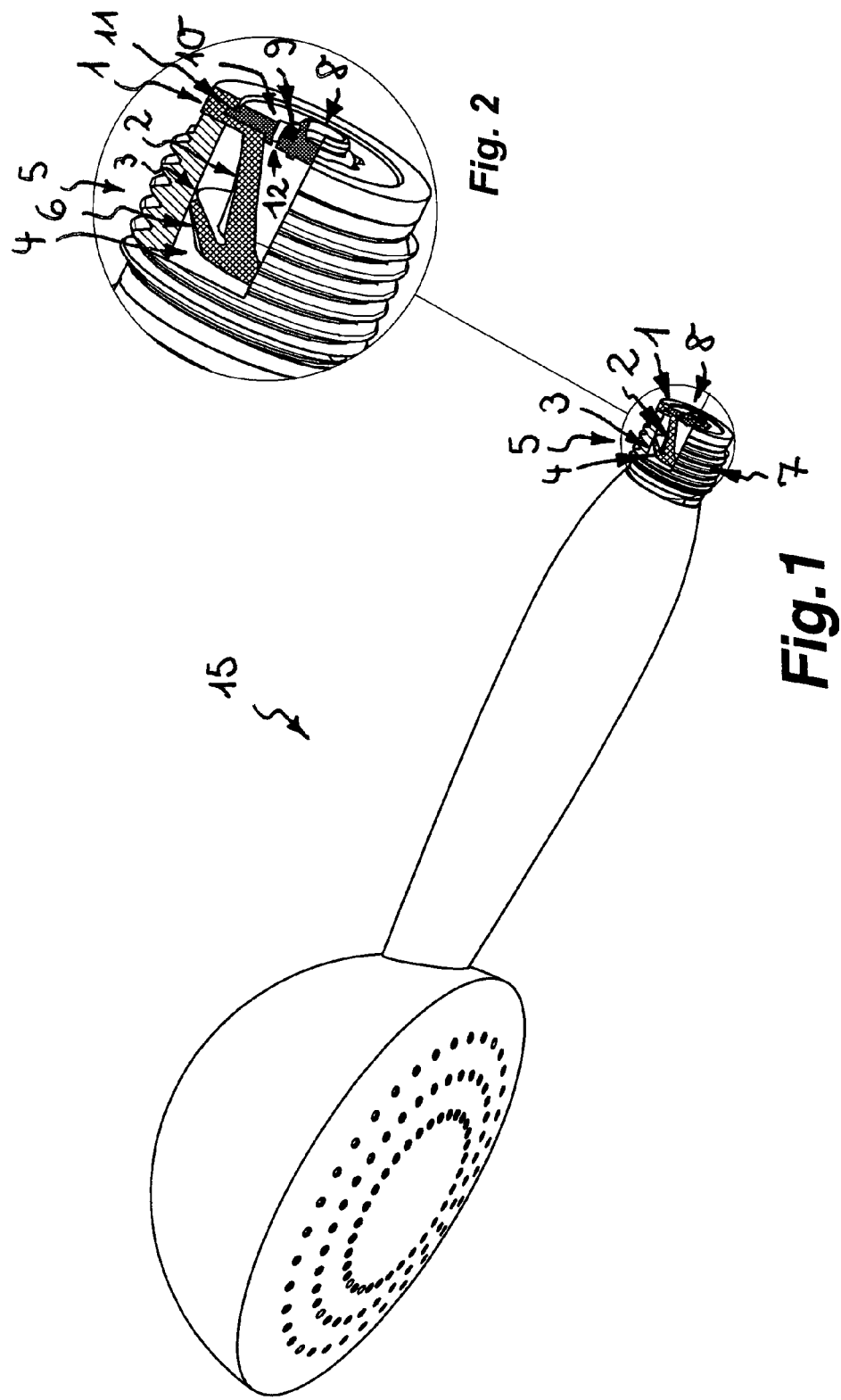

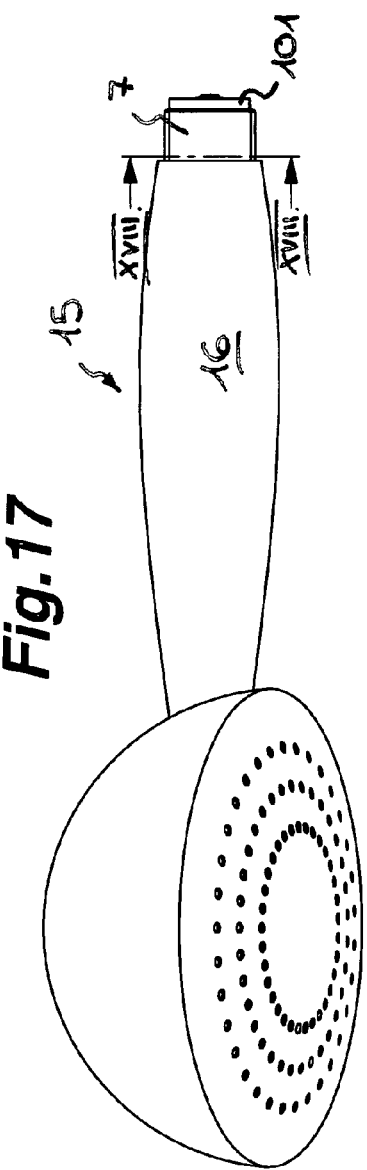
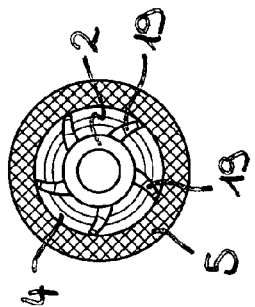
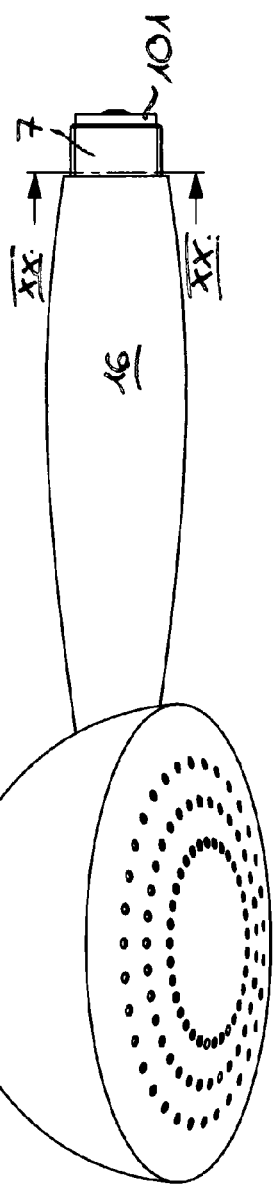
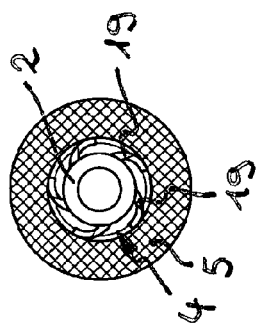

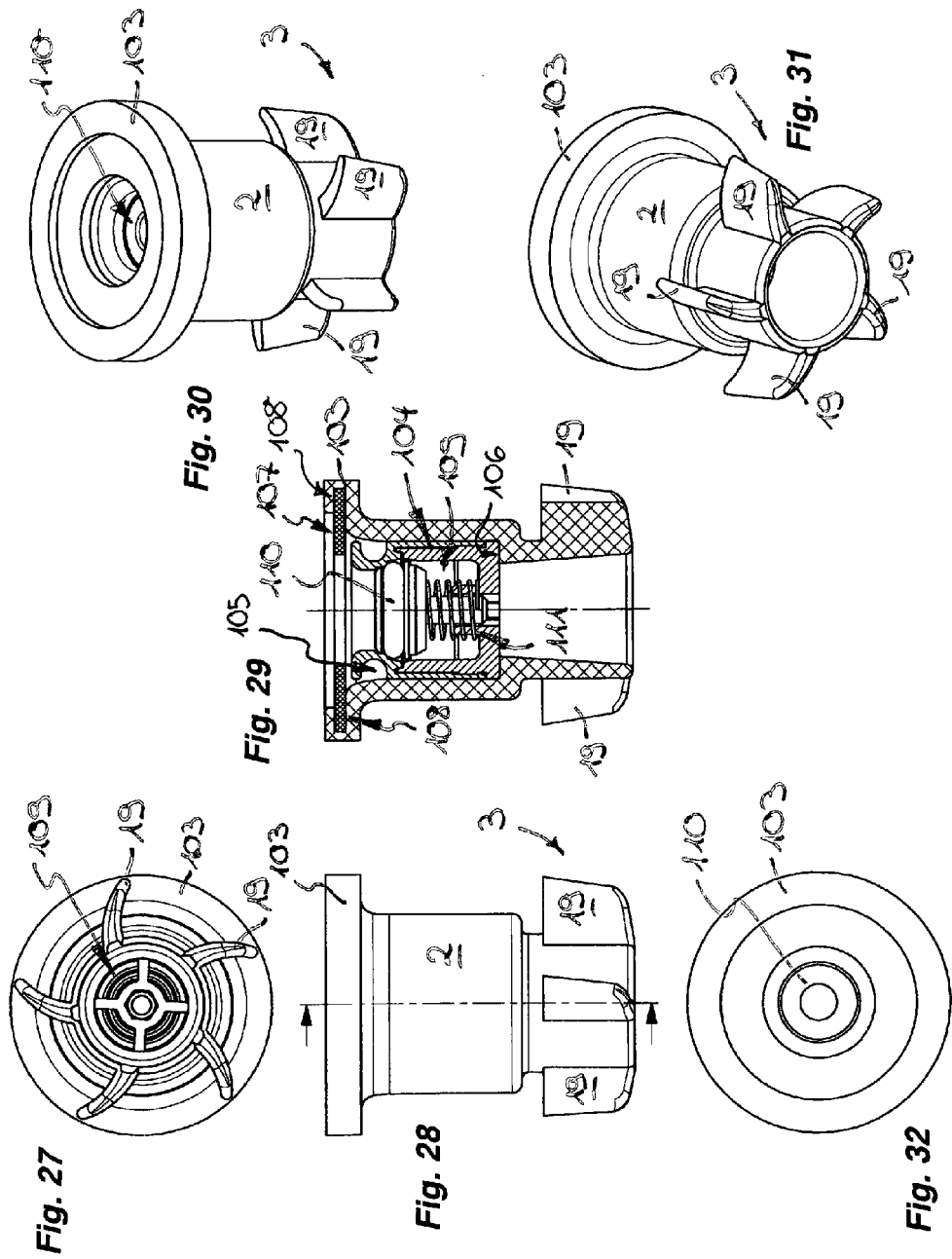

SANITARY INSERTION UNIT AND SHOWER FITTING HAVING A SANITARY INSERTION UNIT

BACKGROUND

The present invention relates to a sanitary insert unit which has a sealing ring. The invention is also concerned with a sanitary insert unit which has a flow regulator or is configured as a flow regulator. The present invention also relates to a shower fitting having a sanitary insert unit which contains a flow regulator and/or a check valve.

A sealing ring which is pushed onto a pipe piece as far as an annular flange is already previously known from FIG. 4 of U.S. Pat. No. 2,343,774 A. The pipe piece which can be inserted into the line end of a sanitary water line has an external thread, onto which a shower head which is to be fastened to the line end can be screwed. The annular flange which is provided on the pipe piece is adjoined immediately by an expanding ring which is conical on the outer circumferential side and protrudes with its tapering end region into the annular opening of the sealing ring in such a way that the sealing ring is expanded when the shower head which bears against the front edge of the line end is screwed increasingly onto the external thread of the pipe piece and the annular flange is moved with every thread turn in the direction of the shower head. Here, the sealing ring is expanded in such a way that it bears frictionally against the inner circumference of the line end and is capable of holding the shower head fixedly there.

A sanitary insert unit is already previously known from DE 20 2008 017 031 from the applicant, which sanitary insert unit is configured as a flow regulator which has a throttle body which is made from elastic material, which throttle body is arranged in the throughflow channel of a regulator housing and delimits a control gap between itself and a control profiling which is provided on an inner or outer circumferential channel wall. This control gap can be deformed in its clear throughflow cross section as a consequence of the throttle body which is deformed under the pressure of the medium which flows through, in such a way that the water volume which flows through per unit time is set to a fixed value independently of the current water pressure. The regulator housing of the previously known flow regulator bears a clamping region on the outer circumferential side, which clamping region is intended for clamping in the previously known flow regulator between two line sections which are connected to one another. Here, this clamping region is formed by the inflow-side and outflow-side end face of a sealing ring, in the ring opening of which the regulator housing is arranged. In an exemplary embodiment which is shown in FIGS. 7 and 9 of DE 20 2008 017 031, the previously known flow regulator is inserted into the outflow-side union nut of a flexible hose line, which union nut for its part is screwed to the shower connection of a hand shower. The previously known flow regulator can therefore be fixed captively in the internal threads of union nuts, either on the fitting outlet side or the hose inlet side, and combines the function of a flow regulator and of an annular seal within itself. It is a particular advantage of the previously known flow regulator that it can also be used in exchange for an originally provided sealing ring, without dimensional deviations and greater gaps occurring in this region.

The previously known installation part which consists of the flow regulator and the annular seal can, however, at any rate be accommodated securely in the union nut of a flexible hose line during storage and transport. Hand showers which can be used as kitchen or shower heads are usually marketed, however, without an associated shower hose. If, however, a shower fitting of this type is to be marketed with an annular seal which also comprises a flow regulator, there is the problem of fixing the flow regulator permanently to the hand shower handle which is always provided with an external thread.

Flow regulators which are fixed by an interference fit in the shower handle are already known; this presupposes that the inner wall of the shower handle terminates sealingly with the inserted flow regulator, with the result that no bypass is produced. Furthermore, it is required that an axial stop is formed in the shower handle, since the operating pressure causes an axial force on the flow regulator as a result of the pressure loss at the latter. This force has to be absorbed in the shower wall.

Despite the as a rule uniform ½" threaded connection to connect the shower hose, the shower handles on the market often have different internal diameters in the shower handle, however, which are additionally of different conical configuration depending on the shower-specific production and as a rule also do not have an axial stop for a flow regulator or similar installation part.

SUMMARY

There is therefore, in particular, the object of providing a sanitary insert unit which can be fastened permanently but nevertheless easily detachably to a line section; the insert unit according to the invention is also to be capable of being used in different line sections with different diameters. Finally, there is also the object of providing a shower fitting, to the line section of which, which is designed as a shower connection, a sanitary insert unit can be fastened permanently but nevertheless easily detachably.

In the sanitary insert unit of the type mentioned in the introduction, the solution according to the invention of this problem is provided by one or more of the features discussed below.

The present invention makes it possible to captively fix a sealing ring or a sealing ring with an integrated flow regulator and/or check valve in a multiplicity of shower handles of different design, without it being necessary for special requirements to be made of the design or the dimensional stability of these shower handles.

The insert unit according to the invention has a sealing ring which, to this end, has a sleeve-shaped projection, which projection bears a circumferentially protruding head made from elastic material at its free end region, which head, during the insertion of the projection into the clear line interior of the line section which is assigned to the projection, can be deformed at least in regions in such a way that the head of the projection bears against the inner circumferential wall which defines the clear line interior of the line section. Since the projection which is provided on the sealing ring bears with its circumferentially protruding head against the inner circumferential wall which defines the clear line interior of the line section, the projection and, with it, also the sealing ring are held permanently on the line connection, in order for it to be possible to connect this line section to another line section at any given time in order to form an in this respect continuous line. The projection, protruding into the shower handle, of the sealing ring, into which, for example, a flow regulator can be injection-molded or a flow regulator and/or a check valve can be installed, can be held by a frictional connection and/or positively locking connection of the diameter which is adapted to the inner wall of the shower handle and the restoring forces which result from the elasticity.

The firm hold of the sealing ring during transport and storage of the line section which bears it is promoted if the head of the projection bears frictionally against the inner circumferential wall.

One preferred embodiment according to the invention provides that the projection is molded integrally onto the sealing ring. If the projection is molded integrally onto the sealing ring, the sealing ring and the projection together with the head can be produced from the same elastic material.

The sealing ring can be loaded on both sides of the circumferential edges of the line sections to be connected to one another if the projection is molded integrally onto that inner circumferential edge region of the sealing ring which defines the ring opening. In this way, the end sides of the sealing ring are available on both sides for loading the end circumferential edges of the line sections.

In order that the head which is provided on the projection can be shaped particularly satisfactorily to the clear line interior of a line section which is assigned to the projection and in order that the head of the projection can also be adapted to differently dimensioned line interiors, it is advantageous if, during the insertion of the projection into the clear line interior, the head of the projection can be deformed in the region of its circumferentially protruding head part region.

One embodiment according to the invention provides that the projection is designed in the shape of a hollow rivet and, at its free end region, bears a head which protrudes circumferentially in a flange-like manner and is made from elastic material.

One preferred embodiment according to the invention provides, however, that the head is formed by at least two lobes or ribs which are made from elastic material, are spaced apart from one another in the circumferential direction, are oriented in the inserting direction and, during the insertion of the projection, are bent in such a way that the head bears with its lobes or ribs against the inner circumferential wall which defines the clear line interior of the line section. A head which is formed by lobes or ribs which are spaced apart from one another and are oriented in the inserting direction can also be adapted easily to the different clear cross sections of various line interiors, a firm hold of the projection in the line interior always being ensured.

In order for it to be possible to easily mold or insert the projection, despite its circumferentially protruding head, into the line interior of an assigned line section, it is expedient if the lobes or ribs are bent in the circumferential direction of the projection preferably in the same direction and, in particular, in the manner of an impeller. A projection, in which the head is formed by ribs or webs which are bent in the manner of an impeller can be screwed easily into the clear line interior of an assigned line section, frictional bearing of the webs or ribs which form the head against the inner circumferential wall which defines the clear line interior being promoted.

The insertion of the head which projects circumferentially beyond the projection is promoted if the head widens in the inserting direction.

One development according to the invention of a significance which is independently worthy of protection provides that, in the passage channel and, in particular, in the ring opening of the sealing ring, a flow regulator is provided with at least one throttle body which is made from elastically deformable material, is arranged in the throughflow channel of a regulator housing and delimits a control gap between itself and a control profiling which is provided on an inner or outer circumferential channel wall, which control gap can have its clear throughflow cross section varied as a consequence of the throttle body which can be deformed under the pressure of the medium which flows through.

However, it is also possible that a check valve with a valve body is provided in the passage channel, which valve body can be moved by the fluid which flows through in the throughflow direction of the check valve out of a closed position into an open position counter to a restoring force. With the aid of a check valve of this type, for example, a water feed can be secured against contaminated water which is pressed or sucked back.

One simple and advantageous embodiment according to the invention provides that the passage channel is configured in a part region as a receiving cavity for receiving a check valve and/or a flow regulator.

Here, it can be advantageous if the check valve and/or flow regulator situated in the receiving cavity are/is secured in the axial direction by means of a securing ring or by means of a flow regulator which is held in the ring opening of the sealing ring. To this end, the sealing ring can bear an annular groove on the inner side in the region of its ring opening, in which annular groove the securing ring or the flow regulator of optionally disc-shaped configuration engages in a positively locking manner.

A further solution according to the invention of the problem set forth above, in which solution the sanitary insert unit is configured as a flow regulator or has a flow regulator, provides that the flow regulator bears a sleeve-shaped projection, the head of which, which protrudes circumferentially at the free end region of the projection and is produced from elastic material, can be deformed at least in regions during the insertion of the projection into the clear line interior of a line section which is assigned to the projection, in such a way that the head of the projection bears against the inner circumferential wall which defines the clear line interior of the line section, and that the sleeve interior of the projection is connected to the throughflow channel of the flow regulator.

In this insert unit according to the invention, the flow regulator bears a sleeve-shaped projection which can be introduced into the line opening of a line section which is assigned to the projection and, for example, into the line opening at the shower connection of a shower fitting. Here, a circumferentially protruding head which is produced from elastic material is provided at the free end region of the projection. Since the head which is provided at the free end region of the projection can bear frictionally with its circumferential edge region which protrudes beyond the projection against the inner circumferential wall of the line section, the projection which bears the head can be introduced into the line opening in such a way that the flow regulator can be connected virtually captively to the line section and, in particular, the shower fitting which surrounds the line section. Since the head which is produced from elastic material can be adapted satisfactorily to the sealed line cross section of the line section, the flow regulator according to the invention can also be used in various shower fittings with different clear line cross sections.

Here, one preferred embodiment according to the invention provides that the regulator housing is arranged in the ring opening of a sealing ring, the inflow-side and outflow-side end face of which form the clamping edge region, and that the sealing ring is connected integrally to the projection which is in the shape of a hollow rivet.

The mounting and the insertion of the projection is facilitated substantially if the projection which is in the shape of a hollow rivet tapers towards its free end region which bears the head.

One preferred field of application provides that the line connection is a constituent part of a shower fitting and, in particular, of a hand shower, which constituent part leads to a shower head.

The exemplary embodiments which are shown in the following text can be used both in an insert unit which is configured as a flow regulator and in an insert unit which has a sealing ring. For instance, one developing embodiment according to the invention provides insert-molding the sealing ring and the regulator housing or producing these components in a two-component or multiple-component injection-molding process. Here, one preferred embodiment according to the invention comprises the fact that the sealing ring is configured as an injection-molded encapsulation of the regulator housing and/or that the regulator housing and the sealing ring which is connected to it are configured as a multiple-component injection-molded part. Since further method steps for mounting regulator housing and sealing ring can be avoided in this embodiment, this embodiment is distinguished by simple and inexpensive production.

Here, a fixed and non-releasable connection between the regulator housing and the sealing ring is also additionally promoted if the regulator housing has at least one through-passage opening which is preferably oriented in the longitudinal direction and is penetrated by the seal material of the sealing ring.

Since the regulator housing and the sealing ring have mutually complementary outer or circumferential contours, these constituent parts are regularly connected to one another in a positively locking manner. In addition or instead, it can be appropriate if the regulator housing and the sealing ring are connected to one another via frictional connection, adhesive bond or material-to-material connection, or a selection of these connection types.

In order for it to be possible to inexpensively produce the sealing ring from rubber or another sealing/compliant material and the regulator housing from a material which is harder than the said rubber, it is also possible, however, if the regulator housing can be connected releasably and preferably can be latched releasably in the ring opening of the sealing ring. In this embodiment, the sealing ring with the projection can be produced from elastic material, whereas the regulator housing in contrast can be produced from a dimensionally stable material.

In order for it to be possible to connect the regulator housing of the flow regulator and the sealing ring to one another fixedly but nevertheless easily releasably, it can be expedient if at least one latching groove or similar latching means is provided on that ring inner circumference which delimits the ring opening, which latching groove or similar latching means can be latched releasably to at least one latching projection or similar mating latching means on the housing outer circumference of the regulator housing.

If the regulator housing is connected releasably to the sealing ring, it can be expedient if the regulator housing can be inserted into the ring opening of the sealing ring from the inflow side or the outflow side as far as a radially inwardly projecting shoulder of the said sealing ring.

The mounting is facilitated if the regulator housing can be sunk into the ring opening of the sealing ring.

In order to protect the flow regulator against dirt particles entrained in the fluid, it can be expedient if a dome screen is connected in front on the inflow side of the flow regulator, which dome screen projects with a central region which preferably tapers conically in the inflow direction beyond the outer contour of the regulator housing and sealing ring.

The solution according to the invention in the shower fitting of the type mentioned in the introduction consists of the features of current Patent Claim 16. The shower fitting according to the invention has a line section which is designed as a shower connection and into the line interior of which a sanitary insert unit can be inserted, which sanitary insert unit has a sleeve-shaped projection which is provided on a flow regulator and/or sealing ring and can be introduced into the line interior in such a way that a head which is made from elastic material, is provided at the free end region of the projection and protrudes circumferentially beyond the projection is deformed in such a way that the head of the projection bears against the inner circumferential wall which defines the clear line interior of the line section. Here, the sleeve interior of the projection and, for example, the ring opening of the sealing ring or the throughflow channel of the flow regulator form a passage channel which is open on both sides.

BRIEF DESCRIPTION OF THE DRAWINGS

Further features according to the invention result from the following description of the figures in conjunction with the claims. In the following text, preferred exemplary embodiments will be explained in yet further detail using the drawing, in which:

FIG. 1 shows a shower fitting which is configured as a hand shower or shower head and, in the region of its partially longitudinally sectioned shower connection, has a line section which bears an external thread and into the clear line interior of which a projection which is connected integrally to a sealing ring is introduced, the sealing ring bearing a flow regulator in its ring opening here, FIG. 2 shows the hand shower or shower head from FIG. 1 in a detailed longitudinal section, in the region of its shower connection, FIG. 17 shows a hand shower which has an insertion opening in its inflow-side shower connection for inserting a projection which is connected to a sealing ring, FIG. 18 shows the hand shower from FIG. 17 in a cross section through sectional plane XVIII-XVIII, FIG. 18 showing the hand shower in a cross section through its shower connection which receives the projection within itself, FIG. 19 shows a hand shower which is comparable with FIG. 17 and has a smaller clear opening cross section in the region of its insertion opening which is provided in the shower connection, FIG. 20 shows the hand shower from FIG. 19 in a cross-sectional illustration in the region of the sectional plane XX-XX in FIG. 19; it can be seen clearly that the projection which is connected to the sealing ring is also adapted to this smaller clear cross section, FIG. 27 shows a component or insert part in a plan view of its inflow end side, which component or insert part is configured comparably to FIGS. 21 to 26 and is formed of sealing ring, projection and insert cartridge, it being possible here for the projection to have two part regions optionally even with a different outer circumference, of which one part region which adjoins the sealing ring has the receiving cavity which is intended to receive the insert cartridge, whereas the other part region which forms the free end region of the projection bears a head which is formed from lobes or ribs which are spaced apart from one another, FIG. 28 shows the sanitary component or insert part from FIG. 27 in a side view, FIG. 29 shows the sanitary component or insert part from FIGS. 27 and 28 in a longitudinal section in the sectional plane XXIX-XXIX according to FIG. 28, FIG. 30 shows the sanitary component or insert part from FIGS. 27 to 29 in a perspective plan view of its outflow side, FIG. 31 shows the sanitary component or insert part from FIGS. 27 to 30 in a perspective plan view of its inflow side, FIG. 32 shows the sanitary component or insert part from FIGS. 27 to 31 in a plan view of its outflow side.

DETAILED DESCRIPTION OF THE PREFERRED EMBODIMENTS

FIGS. 5 to 10 show different embodiments of a sealing ring 1. This sealing ring 1 is a constituent part of a sanitary insert unit which has a sleeve-shaped projection 2 which, at its free end region, bears a circumferentially protruding head 3. The projection 2 is molded integrally onto that inner circumferential edge region of the sealing ring 1 which defines the ring opening, and is produced here from the same elastic material.

Figure 4:
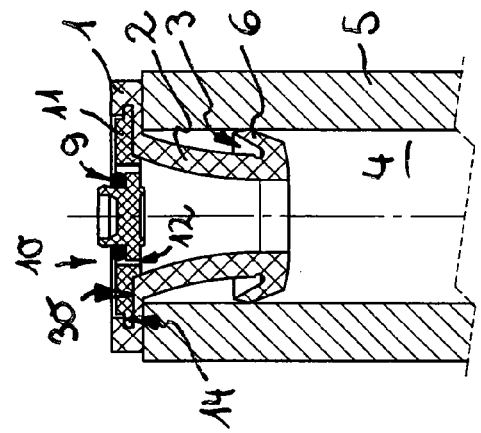
FIG. 4 shows the sealing ring from FIGS. 1 to 3 in a longitudinal section, which sealing ring is situated in a line section with an in contrast smaller clear line diameter.
Figure 3:
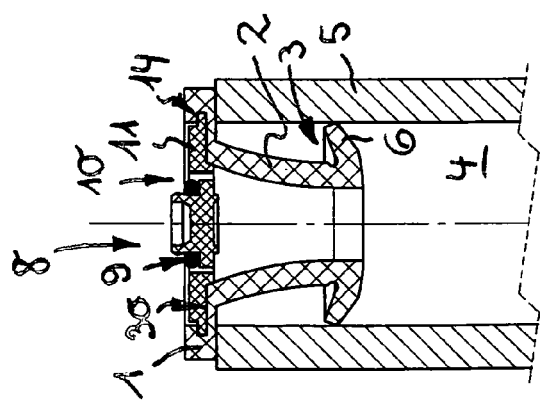
FIG. 3 shows the sealing ring from FIGS. 1 and 2 in a longitudinal section, which sealing ring is situated in a line section with a greater clear line diameter.

As becomes clear from FIGS. 3 and 4, the projection 2 which is provided on the sealing ring 1 can be inserted into the clear line interior 4 of a line section 5 which is assigned to the projection 2. Here, the head 3 which is provided on the projection 2 on the end side can be deformed elastically, at least in its circumferential edge region 6 which protrudes circumferentially beyond the projection 2, in such a way that the head 3 of the projection 2 bears preferably frictionally against the inner circumferential wall which defines the clear line interior 4 of the line section 5.

Thanks to its projection 2, the sealing ring 1 can be held permanently and reliably during storage and transport, even on a line section 5 of this type which bears merely an external thread 7, such as the shower handle of a hand shower or shower head.

Since the projection 2 which is provided on the sealing ring 1 bears with its circumferentially protruding head 3 against the inner circumferential wall which defines the clear line interior 4 of the line section 5, the projection 2 and, with it, also the sealing ring 1 are held permanently in the line connection, in order to seal the coupling and disengaging point between the line sections which are connected to one another, at a given time when the line section 5 is to be connected to another line section to form an in this respect continuous line. Since the interior of the projection 2 which is configured in the shape of a hollow rivet and the ring opening of the sealing ring 1 form a passage channel which is open on both sides, the line sections can be connected to form a line which is continuous and also leakproof in this region.

It becomes clear from a comparison of FIGS. 5 to 10 that the projection 2 is molded integrally onto that inner circumferential edge region of the sealing ring 1 which defines the ring opening. The inflow-side and the outflow-side end faces of the sealing ring 1 are therefore available, in order to be clamped in between the end circumferential edges of two line sections which are connected to one another.

Figure 9:
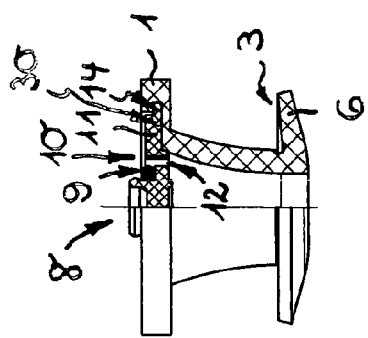
FIG. 9 shows the sealing ring from FIGS. 7 and 8, a disc-shaped flow regulator being inserted into the latching groove which is provided in the ring opening of the sealing ring.
Figure 10:
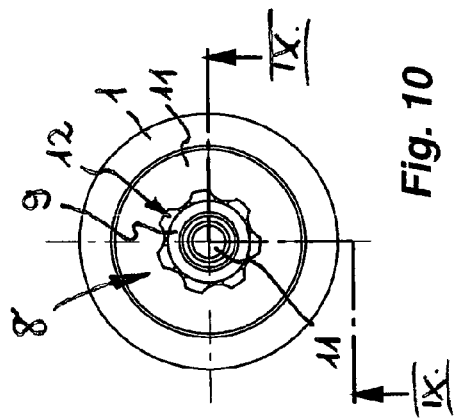
FIG. 10 shows the sealing ring from FIG. 7 in a plan view onto the flat side which faces away from the projection.
Figure 7:
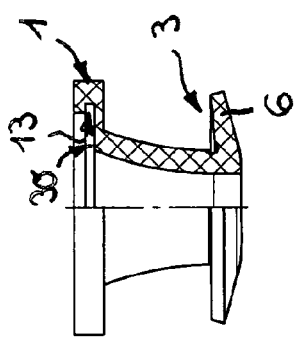
FIG. 7 shows a sealing ring which is comparable to the sealing ring from FIGS. 5 and 6, in a longitudinal section, a latching groove being provided in the ring opening of the sealing ring, into which latching groove a disc-shaped flow regulator can be inserted if required.
Figure 8:
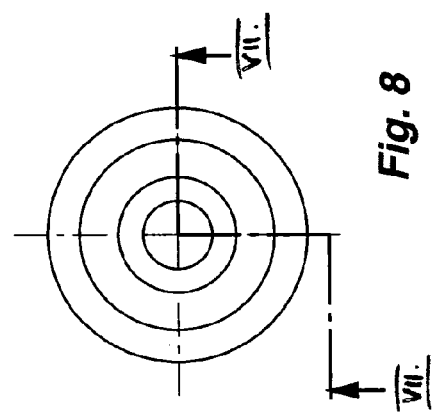
FIG. 8 shows the sealing ring from FIG. 7 in a plan view onto the flat side which faces away from the projection.
Figure 5:
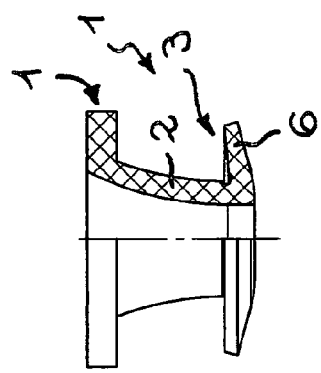
FIG. 5 shows a sealing ring in a longitudinal section, onto which sealing ring a projection in the shape of a hollow rivet is molded integrally, at the free end region of which projection a plate-shaped head is provided which protrudes circumferentially beyond the projection.
Figure 6:
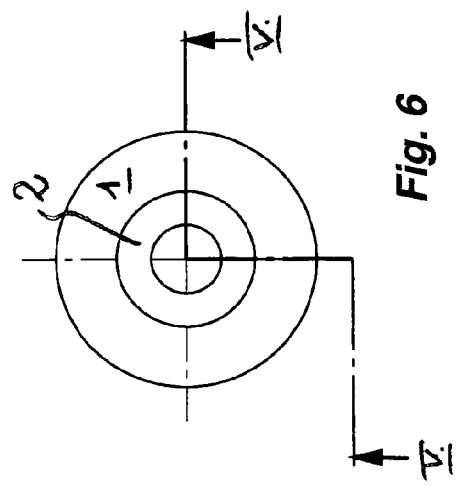
FIG. 6 shows the sealing ring from FIG. 7 in a plan view onto the flat side which faces away from the projection.
Figure 11:
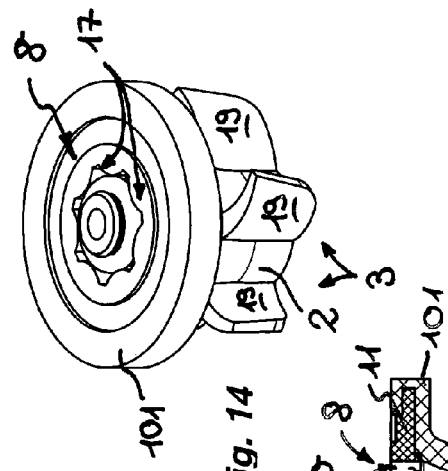
FIG. 11 shows a sealing ring having an integrally connected projection, which projection bears, on its head, a plurality of lobes or ribs which are made from elastic material, are spaced apart uniformly from one another in the circumferential direction and, during the insertion of the projection into a line section, are bent in such a way that the head of the projection bears with the lobes or ribs against the inner circumferential wall which defines the clear line interior of the line section, the sealing ring and the projection which is connected to it being shown in an outflow-side plan view.

FIGS. 9 and 10 show the sealing ring in a developing exemplary embodiment, in which a flow regulator 8 which is of disc-shaped configuration here is provided in the ring opening of the sealing ring. The unit which is formed from the sealing ring 1 and the flow regulator 8 represents a flow regulator, by way of which the volume of the fluid flowing through the line per unit time can be regulated to a fixed value independently of the pressure. To this end, the flow regulator 8 has a throttle body 9 which is made from elastically deformable material and is arranged in a throughflow channel 10 of a regulator housing 11. The throttle body 9 delimits a control gap 12 between itself and a control profiling 11 which is provided on an inner circumferential channel wall, which control gap 12 can have its clear throughflow cross section varied as a consequence of the throttle body 9 which can be deformed under the pressure of the medium which flows through. Here, the control profiling 11 which is provided on the inner circumferential channel wall is formed from formed recesses and moldings of the channel wall which are oriented in the throughflow direction.

A clamping region is provided on the outer circumferential side of the regulator housing 11 of the flow regulator 8, which clamping region serves to clamp in the flow regulator 8 between two line sections which are connected to one another. This clamping region is formed by the inflow-side and the outflow-side end faces of the sealing ring 1. It becomes clear from a comparison of FIGS. 7 and 8 firstly, which show the sealing ring 1 on its own which is assigned to the flow regulator 8, and from FIGS. 9 and 10 secondly that the regulator housing 11 is held in the ring opening of the sealing ring 1 in a manner which is releasable and, in particular, releasably latchable. To this end, a latching groove 13 is provided on the ring inner circumference which delimits the ring opening, which latching groove 13 can be latched releasably to a circumferential latching projection 14 of flange-like configuration on the housing outer circumference of the regulator housing 11.

Here, the regulator housing 11 can be inserted into the ring opening of the sealing ring 1, from the inflow side of the sealing ring 1 as far as a radially inwardly protruding shoulder 15 of the said sealing ring 1. Here, the regulator housing 11 can be sunk into the ring opening of the sealing ring 1. In order to protect the flow regulator 8 against the dirt particles which are possibly entrained in the fluid, it can be expedient if a dome screen (not shown here) is connected in front on the inflow side, which dome screen can also protrude beyond the outer contour of regulator housing 11 and sealing ring 1 with a central region which tapers, in particular, conically in the inflow direction.

FIGS. 1 and 2 show the unit from FIGS. 9 and 10 which is formed of sealing ring 1 and flow regulator 8, in one preferred application example. FIGS. 1 and 2 show a hand shower or shower head 15 which, in the region of its shower handle 16, has a line section 5 which is configured as a shower connection and is equipped on the outer circumferential side with an external thread 7. At the line section 5 which is configured as a shower connection, the hand shower 15 is connected to a line section (not shown in further detail here) which is configured as a flexible shower hose, to form a continuous leakproof water-conducting line. A union nut with internal thread is provided on the line section 5 which is configured as a flexible shower hose, which internal thread can be screwed releasably to the external thread 7 on the line section 5. In order for it to be possible to connect the line sections 5 to one another in the region of this coupling or disconnecting point to form a leakproof line, the sealing ring 1 is clamped in between the line sections 5. Here, the sleeve-shaped projection 2 which protrudes on the outflow-side end side of the sealing ring 1 is inserted into the clear line interior 4 of the line section 5. It becomes clear from the detailed longitudinal section in FIG. 2 that the head 3 which is formed of elastic material and protrudes circumferentially at the free end region of the projection 2 has been deformed during the insertion of the projection 2 into the line interior 4, in such a way that the head 3 of the projection 2 bears against the inner circumferential wall which defines the clear line interior 4. Since the sleeve interior of the sleeve-shaped projection 2 and the ring opening of the sealing ring 1 form a passage channel which is open on both sides, the water can pass the coupling or disconnecting point between the line sections which are connected to one another, which coupling or disconnecting point is sealed to the outside by means of the sealing ring 1.

The flow regulator 8 is provided in the passage channel and (specifically here) in the ring opening of the sealing ring 1, which flow regulator 8 is intended to homogenize the water volume flowing out of the hand shower 15 per unit time, independently of the water pressure which might also fluctuate, and is intended to regulate it to a fixed maximum value.

FIGS. 11 to 16 show a sealing ring 101 which is likewise connected integrally to a projection 2. On its head 3 which is provided at the free end region of the projection 2, which end region faces away from the sealing ring 101, the projection 2 has at least two (and five here) lobes or ribs 19 which are spaced apart from one another, are oriented in the inserting direction of the projection 2 and consist of elastic material. The lobes or ribs 19 which consist of elastic material can be bent during the insertion of the projection 2 into the clear line interior of a line section which is assigned to the projection, in such a way that the head 3 bears with its lobes or ribs 19 against the inner circumferential wall which defines the clear line interior of the line section.

It can be seen from FIGS. 11, 12, 14 and 15 that the lobes or ribs 19 which protrude as a head 3 on the projection 2 are bent in the circumferential direction of the projection 2 in the same direction and, in particular, in the manner of an impeller. The configuration in the manner of an impeller of the lobes or ribs 19 stipulates a preferred rotational direction, in which the projection 2 can be inserted and, in particular, screwed into the clear line interior of the assigned line section.

Figure 13:
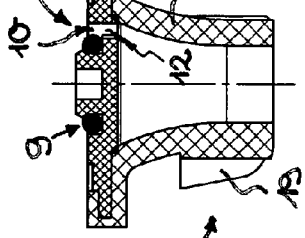
FIG. 13 shows the sealing ring and the projection which is connected to it from FIGS. 11 and 12 in a longitudinal section through sectional plane XIII-XIII from FIG. 12.
Figure 14:
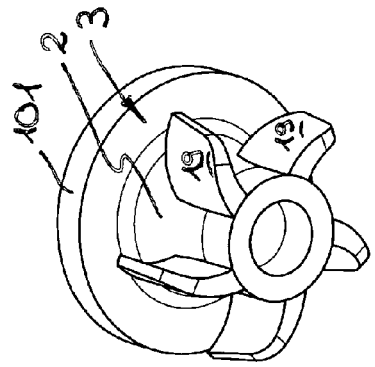
FIG. 14 shows the sealing ring and the projection from FIGS. 11 to 13 in a perspective plan view of the inflow side.
Figure 15:
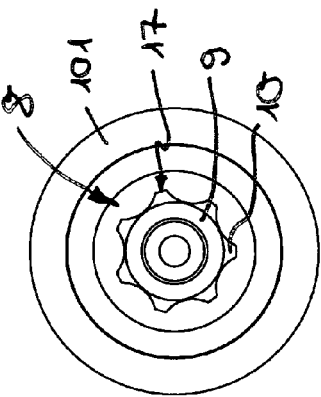
FIG. 15 shows the sealing ring and the projection from FIGS. 11 to 14 in a perspective plan view of the outflow side.
Figure 12:
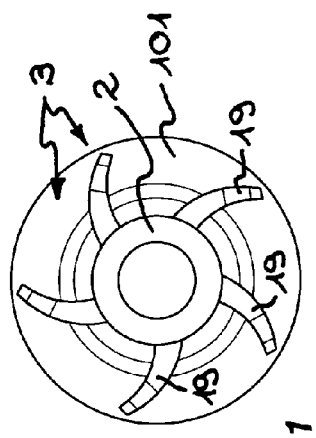
FIG. 12 shows the sealing ring and the projection which is connected to it from FIG. 11 in a side view.
Figure 16:
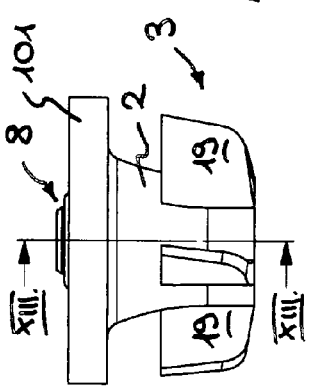
FIG. 16 shows the sealing ring and the projection from FIGS. 11 to 15 in a plan view of the inflow side.
Figure 21:
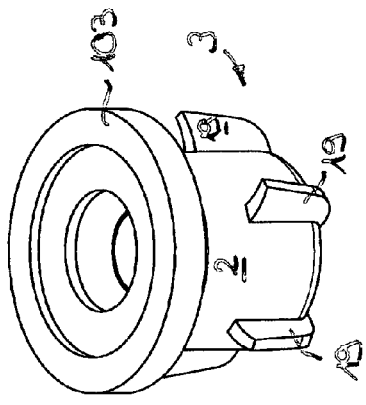
FIG. 21 shows a sealing ring which is connected to a sleeve-shaped projection, in a plan view of its outflow end side, a receiving cavity being provided on one side of the passage channel which is open on both sides of sealing ring and projection, for receiving an insert cartridge which is configured, for example, as a flow regulator and/or as a check valve.
Figure 25:
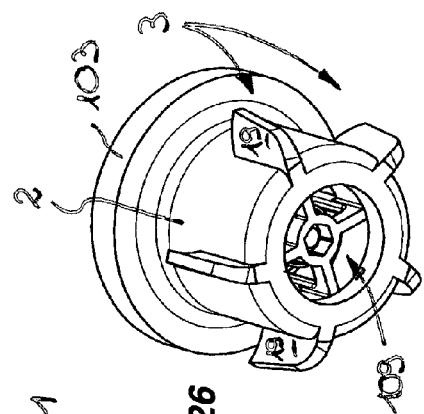
FIG. 25 shows the sanitary component or insert part from FIGS. 21 to 24 in a perspective plan view of its inflow side.
Figure 24:
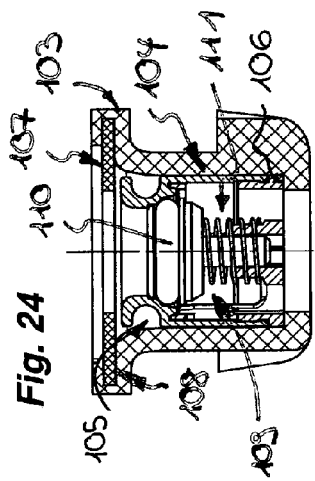
FIG. 24 shows the sanitary component or insert part from FIGS. 21 to 23 in a longitudinal section through the sectional plane XXIV-XXIV in FIG. 22.
Figure 22:
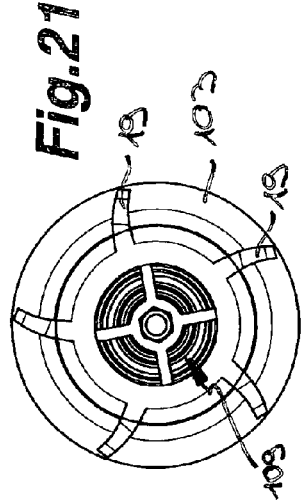
FIG. 22 shows the sanitary component or insert part from FIG. 21 in a side view.
Figure 26:
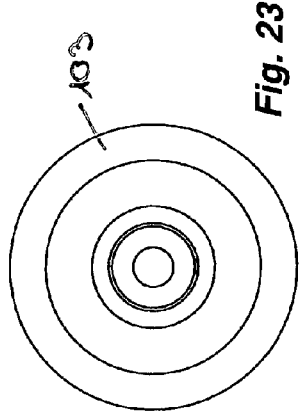
FIG. 26 shows the sanitary component or insert part from FIGS. 21 to 25 in a perspective plan view of its outflow side.
Figure 23:
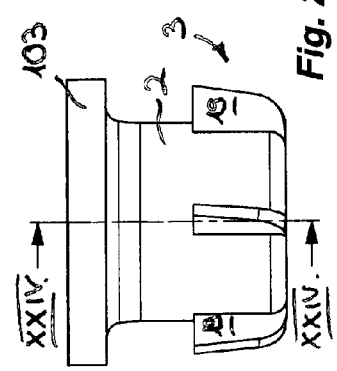
FIG. 23 shows the sanitary component or insert part from FIGS. 21 and 22 in a plan view of its inflow end side.

It can be seen particularly clearly in FIGS. 12, 13 and 15 that the head 3 widens in the inserting direction, with the result that the head can be located on the line interior of the line section by way of a part region or end region which has a smaller cross section.

The sealing ring 101 according to FIGS. 11 to 15 also has a flow regulator 8 in the passage channel and, in particular, in its ring opening. The flow regulator 8 has a throttle body 9 which is made from elastically deformable material, is arranged in the throughflow channel 10 of the regulator housing 11, and delimits a control gap 12 between itself and a control profiling 17 which is provided on an inner or outer circumferential channel wall, which control gap can have its clear throughflow cross section varied as a consequence of the throttle body 9 which can be deformed under the pressure of the medium which flows through.

FIGS. 17 to 20 show the sanitary component which is formed of sealing ring 102, projection 2 and flow regulator 8, in two application examples. FIGS. 17 and 18 firstly and FIGS. 19 and 20 secondly show two hand showers or shower heads 15 which, in the region of their shower handle 16, have a line section 5 which is configured as a shower connection and is configured with an external thread 7 on the outer circumferential side. The hand showers or shower heads 15 are substantially structurally identical with the exception of the different internal diameters in the region of the line interior 4 which is intended for the projection 2.

It can be seen clearly that the lobes or ribs 19 which protrude as a head 3 on the projection 2 can be deformed in such a way that the projection 2 can also be inserted into line interiors 4 of different dimensions. Here, the lobes or ribs 19 bear to a more or less pronounced extent against the inner walls of the line sections 5.

FIGS. 21 to 26 firstly and FIGS. 27 to 32 secondly show two different embodiments of a component which is formed of sealing ring 103, projection 2 and insert cartridge 104 which is inserted into the passage channel. It is also the case in the sanitary components which are shown here that the sealing ring 103 is connected to a sleeve-shaped projection 2 which bears a circumferentially protruding head 3 at its free end region. The head 3 of these sanitary components can also be deformed during the insertion of the projection 2 into the clear line interior 4 of an assigned line section 5, in such a way that the head 3 of the projection 2 can bear against the inner circumferential wall which defines the clear line interior 4 of the line section 5. Here, the sleeve interior of the projection 2 and the ring opening of the sealing ring 103 also form a passage channel which is open on both sides. In order that the projection 2 which is inserted into the line interior 4 can be adapted with its head 3 frictionally to the inner circumferential wall even of line interiors 4 of different dimensions, the head 3 of the projection 2 is formed from at least two (and five here) lobes or ribs 19 which are made from elastic material, are spaced apart from one another, are oriented in the inserting direction and, during the insertion of the projection 2, can be bent in such a way that the head 3 bears with its lobes or ribs 19 against the inner circumferential wall which defines the clear line interior 4 of the line section 5.

It becomes clear in FIGS. 21 to 32 that the insert cartridge 104 which is provided in the passage channel is arranged in a part region of the passage channel, which part region is configured as a receiving cavity 105 and is intended to receive the insert cartridge 104. The insert cartridge 104 can be inserted into the receiving cavity 105 from one of the two end sides and, here, from the inflow side, until the insert cartridge 104 bears against an annular flange or annular shoulder 106 which is provided in the passage channel. The insert cartridge 104 which can be configured, as here, as a check valve or can also in addition or instead have a flow regulator is secured in this receiving cavity 105 by means of a securing ring 107 which is held in a positively locking manner in an annular groove 108 in the passage channel and, in particular, in the ring opening of the sealing ring 103.

The check valve 109 which is provided in the passage channel has a valve body 110 which can be moved by the fluid which flows through in the throughflow direction of the check valve out of a closed position into an open position counter to the restoring force of a restoring spring 111. The valve body 110 is pressed against the valve seat by a backflow which flows counter to the usual throughflow direction, in such a way that a flow of the fluid in the opposite direction is suppressed effectively.

The check valve 109 therefore represents, for example, a securing means against contaminated water which is pressed or sucked back.

Figure 33:
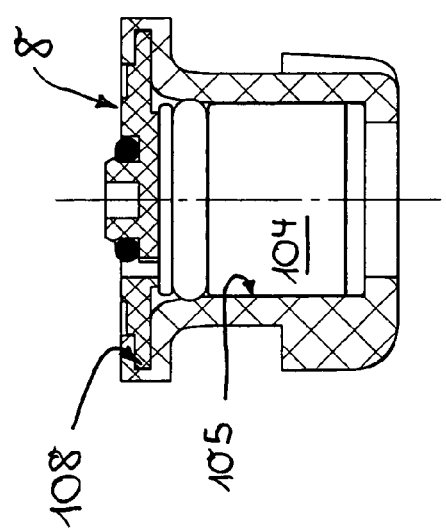
FIG. 33 shows a sanitary insert unit in a longitudinal section, which insert unit is configured comparably to FIG. 29 and has a sealing ring with an integrally formed projection and an insert cartridge which is configured, for example, as a check valve, which insert cartridge is inserted into a receiving cavity which is provided in the projection, and is secured there by means of a disc-shaped flow regulator which in practice forms or replaces a securing ring.

In the exemplary embodiment which is shown in FIG. 33, the insert cartridge 104 which is preferably configured as a check valve is also arranged in a part region of the passage channel, which part region is configured as a receiving cavity 105 and is intended to receive the insert cartridge 104. It becomes clear from a comparison of FIGS. 29 and 33 that, in the insert unit which is shown in FIG. 33, the securing ring 107 is replaced by a disc-shaped flow regulator 8, as has been described in greater detail, for example, in FIGS. 1 to 16. The flow regulator 8 which is of disc-shaped configuration here is held in a positively locking manner in an annular groove 108 which is provided in the passage channel and, in particular, in the ring opening of the sealing ring.

The invention claimed is:

1. Sanitary insert unit comprising a flow regulator (8) having at least one throttle body (9) which is made from elastically deformable material, and is arranged in a throughflow channel (10) of a regulator housing (11) and delimits a control gap (12) between itself and a control profiling which is provided on an inner or outer circumferential channel wall, said control gap having a clear throughflow cross section that is variable as a consequence of the throttle body (9) which can be deformed under pressure of a medium which flows through, the regulator housing (11) bearing a clamping edge region on an outer circumferential side for clamping in the flow regulator (8) between two line sections which are connected to one another, wherein the flow regulator (8) bears a sleeve-shaped projection (2), a head (3) of which, which protrudes circumferentially at a free end region of the projection (2) and is produced from elastic material, is deformable at least in regions during insertion or introduction of the projection (2) into a clear line interior (4) of a line section (5) which is assigned to the projection (2), in such a way that the head (3) of the projection (2) bears against an inner circumferential wall which defines the clear line interior (4) of the line section (5), and a sleeve interior of the projection (2) is connected to the throughflow channel of the flow regulator (8).

2. Insert unit according to claim 1, wherein the regulator housing (11) is arranged in a ring opening of a sealing ring (1, 101), an inflow-side and outflow-side end face of which form the clamping edge region, and the sealing ring (1, 101) is connected integrally to the sleeve-shaped projection (2).

3. Insert unit according to claim 1, wherein the sleeve-shaped projection (2) tapers towards a free end region thereof which bears the head (3).

4. Insert unit according to claim 1, wherein the line section (5) is a constituent part of a shower fitting that leads to a shower head.

5. Insert unit according to claim 1, wherein the sealing ring (1, 101) is configured as an injection-molded encapsulation of the regulator housing (11) and the sealing ring (1, 101) which is connected to it is configured as a multiple-component injection-molded part.

6. Insert unit according to claim 1, wherein the regulator housing (11) has at least one through-passage opening which is oriented in a longitudinal direction and is penetrated by seal material of the sealing ring.

7. Insert unit according to claim 1, wherein the regulator housing (11) and the sealing ring (1, 101) are connected to one another via at least one of a frictional connection, adhesive bond or material-to-material connection.

8. Insert unit according to claim 1, wherein the regulator housing (11) releasably connected in the ring opening of the sealing ring (1), (101).

9. Insert unit according to claim 8, wherein at least one latching groove (13) is provided on a ring inner circumference of the sealing ring (1, 101) which delimits the ring opening, said latching groove (13) is releasably latchable to at least one latching projection (14) on an housing outer circumference of the regulator housing (11).

10. Insert unit according to claim 9, wherein the regulator housing (11) is insertable into the ring opening of the sealing ring (1, 101) from an inflow side or an outflow side as far as a radially inwardly projecting shoulder (30) of the sealing ring (1, 101).

11. Insert unit according to claim 10, wherein the regulator housing (11) can be sunk into the ring opening of the sealing ring.

12. Insert unit according to claim 1, wherein a dome screen is connected in front on an inflow side of the flow regulator (8), said dome screen projects with a central region in an inflow direction beyond an outer contour of the regulator housing (11) and sealing ring.

\* \* \* \* \*